United States Patent [19]
Date et al.

[11] 3,916,850
[45] Nov. 4, 1975

[54] INTAKE AND EXHAUST MANIFOLD ASSEMBLY FOR INTERNAL COMBUSTION ENGINE

[75] Inventors: Tasuku Date, Tokyo; Soichi Nakano, Kawagoe; Yoshitoku Iizuka, Toda, all of Japan

[73] Assignee: Honda Giken Kogyo Kabushiki Kaisha, Tokyo, Japan

[22] Filed: Feb. 25, 1974

[21] Appl. No.: 445,823

[30] Foreign Application Priority Data
Mar. 6, 1973 Japan.................. 48-25729

[52] U.S. Cl. ........ 123/52 M; 123/122 R; 123/325 T
[51] Int. Cl.² .................. F02B 77/12; F02B 19/00
[58] Field of Search ........ 165/52; 123/325 T, 52 M, 123/122 R, 122 AB, 325 PA, 75 B; 60/323, 322, 320

[56] References Cited
UNITED STATES PATENTS

| | | | |
|---|---|---|---|
| 1,273,356 | 7/1918 | Good........................... | 123/122 AB |
| 1,289,868 | 12/1918 | Moreland....................... | 165/52 |
| 1,976,086 | 10/1934 | Otwell.......................... | 165/52 X |
| 2,047,080 | 7/1936 | Maniscalco..................... | 165/52 X |
| 3,543,736 | 12/1970 | Suzuki et al.................... | 123/325 T |
| 3,645,092 | 2/1972 | Tatsutomi...................... | 60/322 |
| 3,717,131 | 2/1973 | Chana et al.................... | 123/122 AB |
| 3,799,196 | 3/1974 | Scheitlin et al.................. | 60/323 |
| 3,832,984 | 9/1974 | Taguchi........................ | 123/122 AB |

FOREIGN PATENTS OR APPLICATIONS

| | | | |
|---|---|---|---|
| 698,104 | 11/1940 | Germany...................... | 123/122 R |

*Primary Examiner*—Charles J. Myhre
*Assistant Examiner*—William C. Anderson
*Attorney, Agent, or Firm*—Lyon & Lyon

[57] ABSTRACT

An intake and exhaust manifold assembly is provided for an internal combustion engine of the type in which each main combustion chamber is connected to an auxiliary combustion chamber, respectively, through a torch nozzle. The rich mixture supplied to the auxiliary chamber is ignited to cause a torch flame to be projected through the torch nozzle to ignite a lean mixture supplied to the main chamber. The intake manifold includes a riser for the rich mixture and the lean mixture, together with intake passages for the auxiliary combustion chambers and main combustion chambers. The exhaust manifold comprises a split housing enclosing and spaced from a thin wall metal liner. The intake manifold is secured in position on top of the exhaust manifold. Heat-receiving surfaces on the intake manifold are placed above aligned openings in the liner and upper half of the housing to heat both the lean mixture and rich mixture by the heat of the exhaust gases. The liner is secured to the upper half of the split housing by means of fasteners near the aligned openings. The liner is otherwise free to move by thermal expansion relative to the enclosing housing. A baffle plate in the liner directs exhaust gases toward said aligned openings.

14 Claims, 6 Drawing Figures

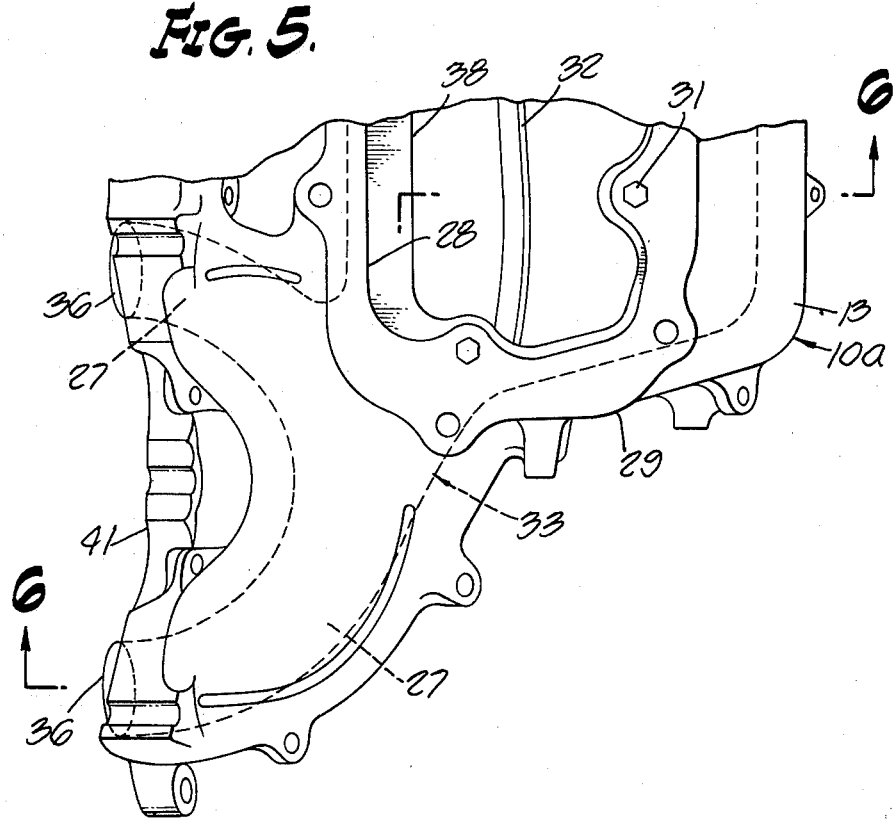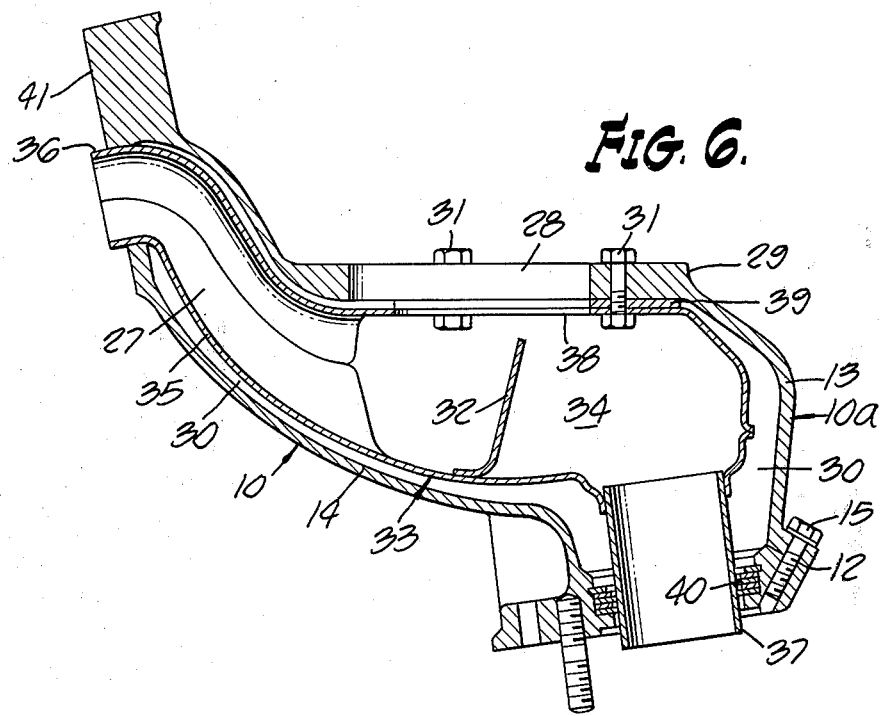

INTAKE AND EXHAUST MANIFOLD ASSEMBLY FOR INTERNAL COMBUSTION ENGINE

This invention relates to internal combustion engines and is particularly directed to an intake and exhaust manifold assembly for engines of the type which have a lean mixture supplied to the main combustion chambers, a rich mixture supplied to the auxiliary combustion chambers, and a torch nozzle connecting each auxiliary chamber to its respective main chamber. It is desirable to use the heat of the engine exhaust gases to heat the lean mixture supplied to the main combustion chambers and also to heat the rich mixture supplied to the auxiliary combustion chambers. Prior art devices have either been inefficient in transferring quantities of heat as required or have been unsuitable for economical manufacture on a quantity production basis, or both.

In accordance with this invention, intake and exhaust assemblies for engines of the type described comprise an intake manifold positioned above and secured to an exhaust manifold. The intake manifold is preferably formed as a single integral casting and contains a riser for supporting the lean mixture carburetor, a riser for supporting the rich mixture carburetor, separate passages for delivering lean mixture and rich mixture to the main chambers and auxiliary chambers, respectively, of the engine, and heat-receiving surfaces for heating both mixtures to insure vaporization and minimize formation of fuel droplets.

The exhaust manifold includes a split housing enclosing and spaced from a thin-wall metal liner which is supported within the enclosing housing so that it may move with respect thereto under thermal expansion forces. Aligned openings are provided in the liner and the upper half of the enclosing housing so that the exhaust gases may be directed against the heat-receiving surfaces provided on the intake manifold. The liner is suspended within the split housing by means of fastenings positioned in the region of the aligned openings, so that the multiple inlet ends of the liner and the single discharge end thereof may move independently under thermal deformations. A baffle within the interior of the liner directs the flow of hot exhaust gases toward the aligned openings and against the heat-receiving surfaces on the intake manifold.

Other and more detailed objects and advantages will appear hereinafter.

In the drawings:

FIG. 5 is a top plan view of the exhaust manifold, the intake manifold being removed.

FIG. 6 is a sectional side elevation taken substantially on the lines 6—6 as shown in FIG. 5.

Figure 1:
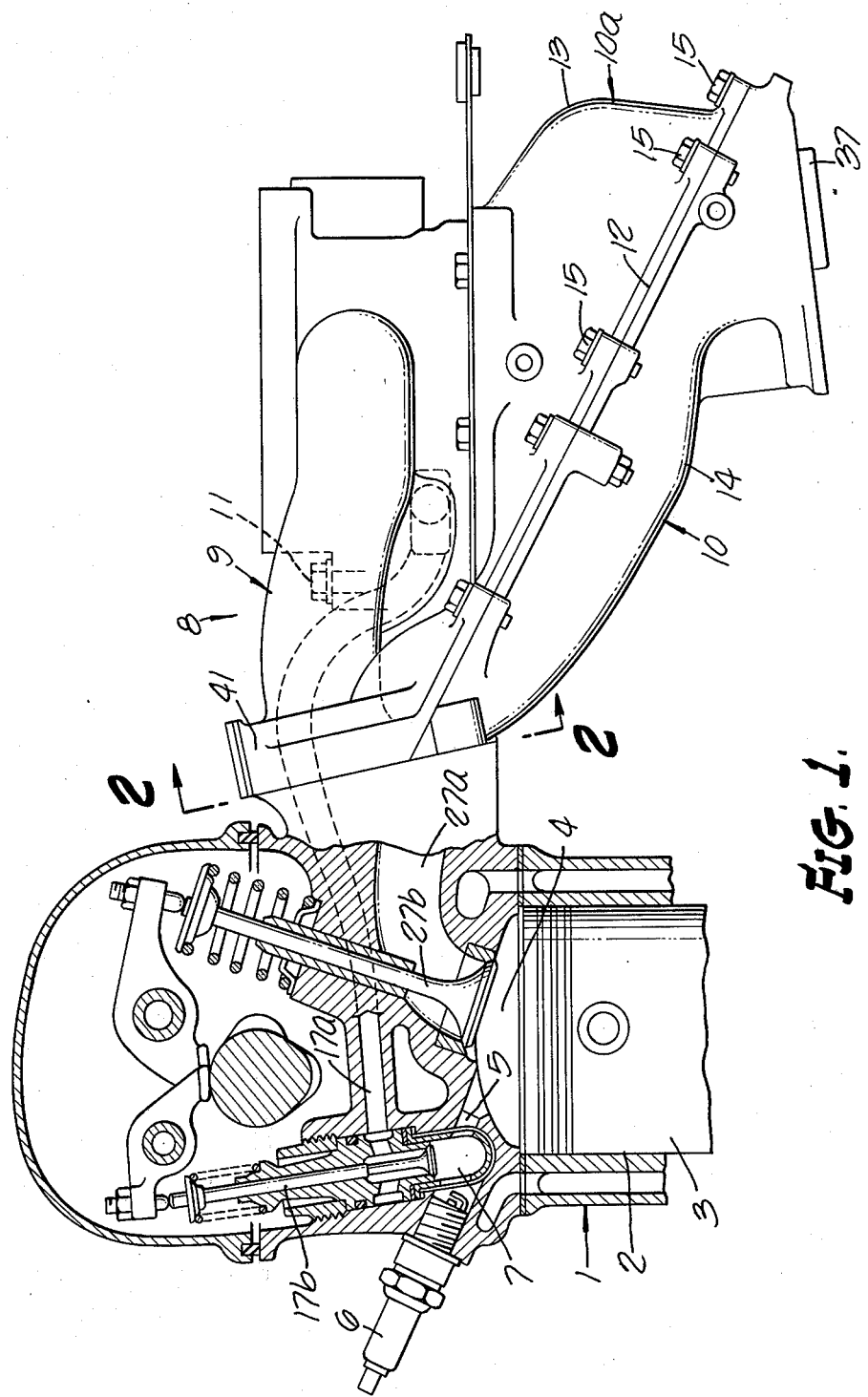
FIG. 1 is a side elevation partly in section showing a preferred embodiment of this invention.

Referring to the drawings, the internal combustion engine generally designated 1 has a plurality of cylinders 2 each having a piston 3 mounted to reciprocate therein. While the engine shown in the drawings has four cylinders, it is to be understood that a greater or lesser number may be employed if desired. Each piston 3 forms one wall of a main combustion chamber 4 and each main chamber 4 has a torch nozzle 5 which connects it to its respective auxiliary chamber 7. A spark plug 6 is provided to ignite the mixture in the auxiliary chamber 7. A lean air-fuel mixture is supplied to the main chamber 4 and a rich air-fuel mixture is supplied to the auxiliary chamber 7. When the mixture in the auxiliary chamber is ignited by the spark plug 6, a flame is produced which is projected through the torch nozzle 5 into the main chamber 4 to ignite the lean mixture therein.

In accordance with this invention, the intake and exhaust system generally designated 8 is mounted on one side of the engine 1 and comprises an intake manifold 9 mounted above an exhaust manifold 10 and secured together by bolts 11. The intake manifold 9 is preferably formed as a single unitary casting, whereas the exhaust manifold 10 includes an outer split housing 10a comprising an upper half 13 and a lower half 14 joined together along mating surfaces 12 and secured together by threaded fastenings 15. The housing 10a provides mechanical strength, and prevents damage to the liner 33 which it envelops.

Figure 3:
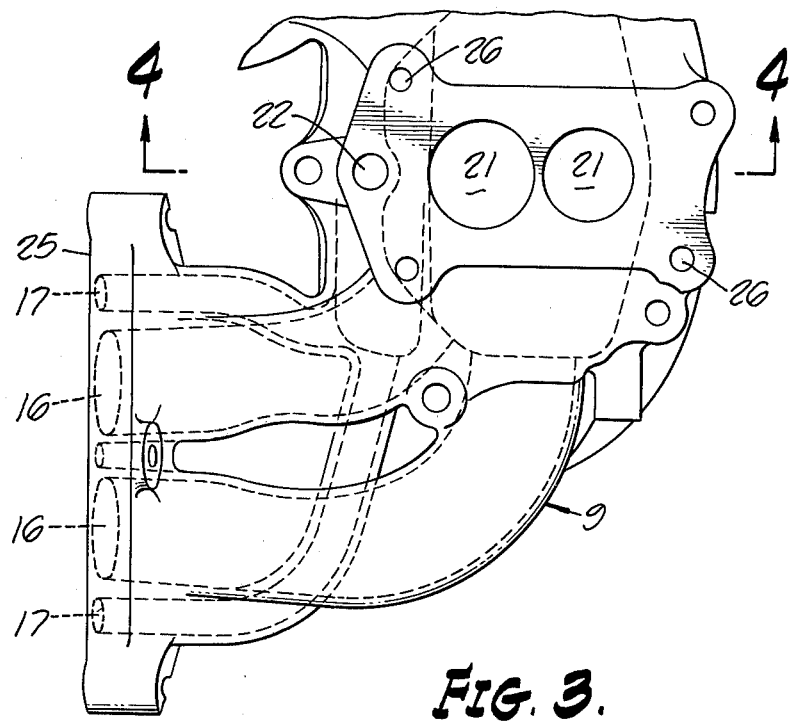
FIG. 3 is a top plan view.
Figure 4:
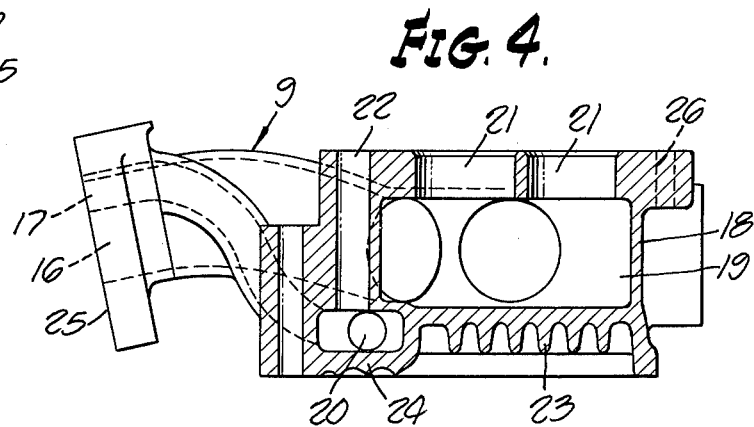
FIG. 4 is a sectional side elevational taken substantially on the lines 4—4 as shown in FIG. 3.

As best shown in FIGS. 3 and 4, the intake manifold 9 comprises a riser 18 of box-like shape from which pairs of main intake passages 16 and auxiliary intake passages 17 extend on each side of the riser. Each main intake passage 16 is connected to a main combustion chamber 4, respectively, and to an intake valve, not shown. Similarly, each auxiliary intake passage 17 is connected to one of the auxiliary combustion chambers 7, respectively, through a passageway 17a in the engine and an auxiliary intake valve 17b. The riser 18 is divided into a main intake chamber 19 for the main intake passages 16, and an auxiliary intake chamber 20 for the auxiliary intake passages 17. A main carburetor, not shown, is provided for introducing lean mixtures into the openings 21 and an auxiliary carburetor, not shown, is positioned to provide a rich mixture through the opening 22. The bottom wall of the main riser 19 is provided with a large finned heat-receiving surface 23. Similarly, the bottom wall of the auxiliary riser 20 is provided with a small finned heat-receiving surface 24. The surface 24 is closer to the liner 33 than the surface 23. Adjacent pairs of main and auxiliary intake passages 16 and 17 are provided with a common mounting flange 25 for connection to one side of the engine 1. The bolt holes 26 are provided for mounting the main and auxiliary carburetors, not shown.

As shown in FIGS. 5 and 6, the thick wall housing or outer cover 10a has pairs of exhaust passages 27 branching therefrom, each passage being adapted for connection to an exhaust passage 27a in the engine communicating with a main combustion chamber 4 through an exhaust valve 27b. An opening 28 in the upper half 13 of the housing 10a enables portions of the intake manifold 9 to be heated by the engine exhaust gases, as described below.

A thin wall metal liner 33 is enveloped by and spaced within the housing 10a, and this liner 33 forms a exhaust chamber 34 having four exhaust pipes 35 communicating therewith. Each of the pipes 35 has an entrance end 36 which projects from the housing 10a to be received within a portion of one of the exhaust passages 27a. Each entrance end 36 may move axially with respect to the engine 1 and housing 10a under thermal expansion forces. The chamber 34 has a single discharge pipe 37. The housing 10a and the liner 33 are separated by a space 30 so that they do not have metal-to-metal contact. An opening 38 in the liner communicates with the opening 28 in the flange 29 of the upper housing half 13. Threaded fastenings 31 spaced around the openings 28 and 38 serve to clamp a mounting plate 39 between the liner and the housing half 13, and these threaded fastenings 31 serve to support the liner 33. Interleaved seal rings 40 seal the discharge pipe 37 with respect to the enclosing housing and permit movement of the pipe 37 brought about by thermal expansion of the liner 33. Mounting flanges 41 connect the housing 10a to a side face of the engine 1.

Figure 2:
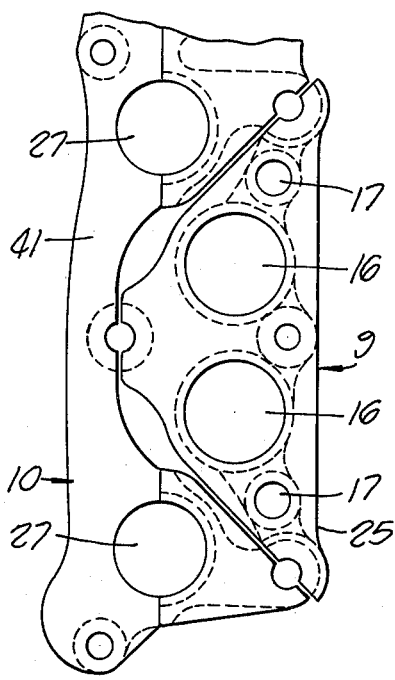
FIG. 2 is an end view taken substantially on the lines 2—2 as shown in FIG. 1; only one-half of the device being shown, since it is symmetrical about the centerline.

Thus, the intake and exhaust manifolds 9 and 10 are placed one on top of the other and are attached to each other with said bolts 11 to accomplish an assembly. The mounting flanges 25 of the intake manifold and the mounting flanges 41 of the exhaust manifold are placed as shown in FIG. 2 so that one is located on top of the other. This brings the parts into such a position that the opening 28 in the upper half 13 of the housing 10a is located adjacent the bottom of the riser 18 of the intake manifold 9. The heat-receiving surfaces 23 and 24 are heated by exhaust gases passing through the liner 33 and contacting such heat-receiving surfaces through the openings 38 and 28.

In order to bring about a more efficient heating, a baffle plate 32 is provided in the liner 33 so that the flow of exhaust gases is caused by the baffle plate to heat the surfaces 23 and 24 through the openings 38 and 28.

The thin wall of the liner 33 and consequent small thermal capacity together with the insulating layer of air in the clearance space 30 causes the liner 33 to heat up rapidly when the engine begins to operate. The relatively heavy enclosing housing 10a formed by the halves 13 and 14 minimizes the danger of damage to the liner 33. Since the liner 33 is supported on the housing half 13 only by means of the threaded fastenings 31, the liner 33 is free to move within its enclosure to accommodate thermal expansion. The labyrinth seal rings 40 allow both axial and radial movement of the discharge pipe 37.

The device of this invention is well suited to economical manufacture on a quantity production basis because it permits the intake manifold and exhaust manifold to be constructed separately, and then connected together one above the other. Because the exhaust manifold underlies the intake manifold and because the openings 38 and 28 are located immediately below the bottom of the riser in the intake manifold, efficient heating of the rich mixture and the lean mixture is promoted in the intake manifold from the heat of the exhaust gases. The baffle plate 32 in the liner 33 diverts the flow of exhaust gas in an upward direction to improve the heating efficiency.

Having fully described our invention, it is to be understood that we are not to be limited to the details herein set forth, but that our invention is of the full scope of the appended claims.

We claim:

1. A manifold system for an internal combustion piston engine of the type having an auxiliary combustion chamber associated with each main combustion chamber and connected thereto by a torch nozzle, the manifold system comprising, in combination: an intake manifold including a main intake chamber and main intake passages extending from said main intake chamber to the engine to deliver a lean air-fuel mixture to each main combustion chamber, said intake manifold also including an auxiliary intake chamber and auxiliary intake passages extending from said auxiliary intake chamber to the engine to deliver a rich air-fuel mixture to each auxiliary combustion chamber, an exhaust manifold comprising a thin wall metal liner enveloped by and spaced within a thick wall outer housing, said liner having pipes for collecting exhaust gases from each main combustion chamber and having an exhaust chamber connected to each said pipe, said exhaust manifold having a lateral opening, and a riser member forming a part of said intake manifold and associated with said opening to transfer heat of the exhaust gases to the intake mixtures in the main intake chamber and the auxiliary intake chamber to insure vaporization of both mixtures, the riser member having a first portion of small area adjacent the auxiliary intake chamber and a second portion of large area adjacent the main intake chamber, said first and second portions of the riser member being integrally formed.

2. The combination set forth in claim 1 in which the thick wall outer housing is of split construction comprising an upper portion and a lower portion, the upper portion being secured to the intake manifold.

3. The combination set forth in claim 2 in which the thin wall liner is secured to said upper portion of the thick wall housing.

4. The combination set forth in claim 1 in which a baffle is fixed within the exhaust chamber and directs exhaust gases toward said opening and both of said portions of said riser member.

5. The combination set forth in claim 1 in which said first portion of said riser member is positioned closer to said liner than said second portion of said riser member.

6. The combination set forth in claim 1 in which said liner collection pipes for collecting exhaust gases are mounted for thermal expansion movement relative to the engine, said liner having a single discharge pipe mounted for thermal expansion movement relative to said housing, and means for anchoring said liner at a location between said collection pipes and said discharge pipe to minimize the displacement of said collection pipes and said discharge pipe caused by thermal deformation.

7. A manifold assembly for an internal comnustion engine having a plurality of pistons each forming one wall of a plurality of combustion chambers, respectively, the combination of: an intake and exhaust manifold assembly comprising an intake manifold for supplying an air-fuel mixture to the combustion chambers, an exhaust manifold including a thick wall housing enveloping and spaced from a thin wall liner, said liner having a collection chamber connected to a plurality of exhaust pipes for receiving exhaust gases from each of said combustion chambers, the exhaust chamber of said liner and a portion of said housing having aligned lateral openings, means securing said portion of the housing to said intake manifold, said liner having a single discharge pipe extending from said exhaust chamber and projecting through said housing, and means for suspending said liner within said housing at a location between said collection pipes and said discharge pipe to minimize thermal deformations, a portion of said intake manifold being placed to be heated through said aligned openings.

8. The manifold assembly set forth in claim 7 in which the thick wall housing is of split construction having an upper portion and a lower portion, the upper portion containing the opening and being secured to the inlet manifold.

9. A manifold system for an internal combustion piston engine of the type having an auxiliary combustion chamber associated with each main combustion chamber and connected thereto by a torch nozzle, the manifold system comprising, in combination: an intake manifold including a main intake chamber and a main intake passageway extending from said main intake chamber to the engine to deliver a lean air-fuel mixture to each main combustion chamber, said intake manifold also including an auxiliary intake chamber and an auxiliary intake passageway extending from said auxiliary intake chamber to the engine to deliver a rich air-fuel mixture to each auxiliary combustion chamber, an exhaust manifold comprising a thin wall metal liner enveloped by and spaced within a thick wall outer cover, said liner having an exhaust passageway for collecting exhaust gases from each main combustion chamber and having an exhaust chamber connected to each exhaust passageway, said exhaust chamber having an opening formed in a plate and an aligned opening in the outer cover formed in a flange, and fastener means for connecting the plate to the flange, said fastener means comprising the sole fixed connecting means between the liner and the outer cover.

10. The combination set forth in claim 9 in which a baffle fixed within the exhaust chamber directs exhaust gases against the riser member through said aligned openings.

11. The combination set forth in claim 9 in which the riser member has a first portion of small area adjacent the auxiliary intake chamber and a second portion of large area adjacent the main intake chamber.

12. The combination set forth in claim 11 in which said first and second portions of the riser member are integrally formed.

13. The combination set forth in claim 11 in which said first portion of the riser member is positioned closer to the liner than said second portion of the riser member.

14. In combination: a multi-cylinder internal combustion piston engine of the type having an auxiliary combustion chamber associated with each main combustion chamber and connected thereto by a torch nozzle, an intake manifold including a main intake chamber and a plurality of main intake passageways extending from said main intake chamber to the engine for connection to the main combustion chambers, said intake manifold also including an auxiliary intake chamber and a plurality of auxiliary intake passageways extending from said auxiliary intake chamber to the engine for connection to the auxiliary combustion chambers, means for delivering a lean air-fuel mixture to said main intake chamber, means for delivering a rich air-fuel mixture to said auxiliary intake chamber, an exhaust manifold comprising a thin wall metal liner enveloped by and spaced within a thick wall outer cover, said liner having a plurality of exhaust passageways for collecting exhaust gases from the engine and having an exhaust chamber connected to said exhaust passageways, a discharge pipe leading from the liner and extending through the outer cover, said thin wall liner and thick wall cover each having a lateral opening, said lateral openings being aligned, and a riser member formed integrally with said intake manifold and having heat transfer surfaces exposed to said lateral openings to transfer heat of the exhaust gases to the intake mixtures in the main intake chamber and the auxiliary intake chamber to insure vaporization of both mixtures.

* * * * *

UNITED STATES PATENT AND TRADEMARK OFFICE
CERTIFICATE OF CORRECTION

PATENT NO. : 3,916,850
DATED : November 4, 1975
INVENTOR(S) : TASUKU DATE et al

It is certified that error appears in the above-identified patent and that said Letters Patent are hereby corrected as shown below:

Claim 7, line 49, correct spelling of "combustion"

Claim 7, lines 57,58, should read as follows:

--having an exhaust chamber connected to a plurality of collection pipes . . . --

Claim 8, line 6, insert --lateral-- before "opening"

Claim 9, line 13, before "including" insert --and riser member--

Claim 9, line 17, before "also" insert --and riser member--

Signed and Sealed this second Day of March 1976

[SEAL]

Attest:

RUTH C. MASON
*Attesting Officer*

C. MARSHALL DANN
*Commissioner of Patents and Trademarks*